(12) United States Patent
Fucile

(10) Patent No.: US 12,055,641 B2
(45) Date of Patent: Aug. 6, 2024

(54) METHODS AND APPARATUS FOR DIRECT CALIBRATION

(71) Applicant: Woods Hole Oceanographic Institution, Woods Hole, MA (US)

(72) Inventor: Paul Dominic Fucile, Waquoit, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 266 days.

(21) Appl. No.: 17/491,576

(22) Filed: Oct. 1, 2021

(65) Prior Publication Data

US 2022/0155462 A1    May 19, 2022

Related U.S. Application Data

(60) Provisional application No. 63/086,547, filed on Oct. 1, 2020.

(51) Int. Cl.
*G01S 19/23* (2010.01)
*G01J 5/08* (2022.01)
(Continued)

(52) U.S. Cl.
CPC ............ *G01S 19/235* (2013.01); *G01J 5/80* (2022.01); *G01S 17/50* (2013.01); *G01S 19/26* (2013.01); *G01J 5/0878* (2013.01)

(58) Field of Classification Search
CPC ........ G01S 19/235; G01S 17/50; G01S 19/26; G01J 5/80; G01J 5/0878
See application file for complete search history.

(56) References Cited

U.S. PATENT DOCUMENTS

| 5,204,733 A | 4/1993 | Deshayes |
| 6,583,879 B1 * | 6/2003 | Berg ..................... G01J 3/04 |
| | | 356/402 |

(Continued)

OTHER PUBLICATIONS

John W. Pickering, Two integrating spheres with an intervening scattering sample, Apr. 1992, Journal of the Optical Society of America A, vol. 9, Issue 4, pp. 621-631 (Year: 1992).*

(Continued)

*Primary Examiner* — Edmond C Lau
*Assistant Examiner* — Joshua M Carlson
(74) *Attorney, Agent, or Firm* — Douglas Denninger; Cristy Salanga

(57) ABSTRACT

A device and method of use for the calibration of a detector. The calibration device includes a first source configured to produce first electromagnetic energy EMR. A first diffuser is connected to the first source and is configured to accept the first EMR and provide a first diffused portion of the first EMR. An integrating sphere defines an interior and is optically connected to the first diffuser, and is configured to accept the first diffused portion from the first diffuser into the interior. An exit port connected to the integrating sphere is configured to pass at least a portion of electromagnetic energy. A thermal mechanism is configured to adjust and maintain the temperature of at least the first source. The integrating sphere is configured to pass only a second portion of the first diffused portion of the first EMR from the first diffuser to the exit port. In another embodiment, the calibration device has an arm, an actuator, and a module.

(Continued)

The module supports at least a first source that emits electromagnetic energy, a thermal mechanism, and a controller. The actuator is configured to move the arm and module to a calibration position enabling the first source to be within the line of sight of an external detector, while the controller is configured to control the thermal mechanism enabling precise temperature regulation of the source and therefore the regulation of the emitted electromagnetic energy. When the device is not in the calibration position, the actuator is configured to move the arm and module to a stowed position, protecting the device from ambient electromagnetic radiation and harm.

5 Claims, 7 Drawing Sheets

(51) Int. Cl.
*G01J 5/80* (2022.01)
*G01S 17/50* (2006.01)
*G01S 19/26* (2010.01)

(56) References Cited

U.S. PATENT DOCUMENTS

| | | |
|---|---|---|
| 7,508,503 B2 * | 3/2009 | Jang .................. G01J 1/02 |
| | | 356/236 |
| 8,378,290 B1 | 2/2013 | Speake et al. |
| 8,716,651 B2 | 5/2014 | De Ruyter |
| 9,310,298 B2 * | 4/2016 | Labrie .................. G01J 1/0488 |
| 10,048,121 B2 * | 8/2018 | Zimmerman ......... G01J 5/0806 |
| 2013/0003064 A1 * | 1/2013 | Allen .................... G01J 3/0254 |
| | | 356/402 |
| 2021/0140884 A1 * | 5/2021 | Imura ................ G01N 21/6428 |

OTHER PUBLICATIONS

Snail et al., Integrating sphere designs with isotropic throughput, Applied Optics, May 1989, pp. 1793-1799, V.28 No. 10.
Labsphere Inc., Integrating Sphere Theory and Applications, 2017, pp. 1-17.
Pignatelli et al., Improving Launch Vibration Environments for CubeSats, 31st Annual AIAA/USU Conference on Small Satellites, 2017, pp. 1-8.

* cited by examiner calibration position calibration position 5.16 °C 9.8 °C 15.02 °C 19.32 °C 24.06 °C 29.5 °C

METHODS AND APPARATUS FOR DIRECT CALIBRATION

CROSS-REFERENCE TO RELATED APPLICATION

This application claims benefit to U.S. Provisional Patent Application No. 63/086,547 filed on Oct. 1, 2020, the disclosure of which is hereby incorporated by reference in its entirety.

FIELD OF THE INVENTION

This invention relates to the calibration of optical systems. More specifically, this invention relates to the calibration of optical systems including on orbiting satellites. In particular, this invention relates to calibrations in both vacuum and in air, either on orbit or in terrestrial applications, including testing.

BACKGROUND OF THE INVENTION

Practically all optical detectors, including infrared detectors, must be calibrated before and during use. Calibration is required for the detector to produce accurate images of a viewed scene. Without proper calibrations, pixel non-uniformities distort the image signal and the image essentially becomes less accurate.

Typical calibration processes used on infrared detectors involve using a uniform-flux scene provided by a high-emissivity blackbody. The infrared sensor core often has an infrared detector, often in a vacuum package assembly, electronics and controller, a heat sink, and an objective, that is, an optical element that gathers electromagnetic radiation (EMR) and focuses the EMR to produce an image. Objectives typically include one or more lenses which may be combined with other optical elements. Typical calibration is performed using a heater over a range of temperatures from ambient to elevated temperatures. Often, a calibration source radiates energy onto a reflective surface and the reflected light is directed to the detector. Emissive surfaces are also used to calibrate infrared detectors.

A major limitation of reflective or emissive surfaces is that they degrade with time when exposed to the harsh space environment. In addition, conventionally known reflective and emissive surfaces are prohibitively expensive and/or proprietary for low budget small satellites such as CubeSats, or too complex and physically large for such small satellites. Therefore, there is a need for a small, inexpensive, and simple calibrator for optical sensors.

SUMMARY OF THE INVENTION

An object of the present invention is to provide effective, low-cost calibration of optical detectors including sensors, cameras and telescopes.

Another object of the present invention is to efficiently achieve a low degree of linearity for one or more selected wavelengths of electromagnetic radiation (EMR) emitted by a calibration source.

This invention features a calibration device for calibration of a detector, the device including at least a first source configured to produce first electromagnetic energy EMR. A first diffuser is connected to the first source and is configured to accept the first EMR and provide a first diffused portion of the first EMR. A first integrating sphere defines an interior and is optically connected to the first diffuser, and is configured to accept the first diffused portion from the first diffuser into the interior. An exit port connected to the first integrating sphere is configured to pass at least a portion of electromagnetic energy. A thermal mechanism is configured to adjust and maintain the temperature of at least the first source. The first integrating sphere is configured to pass only a second portion of the first diffused portion of the first EMR from the first diffuser to the exit port for use by the detector for calibration.

In a number of embodiments, the first diffuser includes a second integrating sphere which has an interior surface. In some embodiments, the second integrating sphere is physically smaller than the first integrating sphere. In one embodiment, the second integrating sphere includes a modified reflective coating disposed on the interior surface. In certain embodiments, the device further includes at least a second source configured to produce second electromagnetic energy EMR having a different frequency than the first EMR. In certain embodiments, the device further includes a thermal mass wherein the thermal mechanism is configured to adjust the temperature of the thermal mass. The thermal mass may serve as a mounting block for at least the first source. In some embodiments, the device further includes a radiometer optically connected to the exit port and configured to record irradiance emitted from inside the first integrating sphere. In one embodiment, the at least one exit port of the first integrating sphere includes a diffusive material such as a white neutral material such as a semi-opaque, white diffusive glass. In another embodiment, the exit port is translucent.

This invention also features a calibration device having an arm, an actuator, and a module. The module supports at least a first source that emits electromagnetic energy, a thermal mechanism, and a controller. The actuator is configured to move the arm and module to a calibration position enabling the first source to be within the line of sight of an external detector, while the controller is configured to control the thermal mechanism enabling precise temperature regulation of the source and therefore the regulation of the emitted electromagnetic energy. When the device is not in the calibration position, the actuator is configured to move the arm and module to a stowed position, protecting the device from ambient electromagnetic radiation and harm. In addition, the fully enclosed module improves over degradation intolerance experienced from the space environment with exposed designs.

This invention further features a method of calibrating a detector, including selecting a calibration device having an arm, an actuator, and a module. The module includes a first source, a thermal mechanism and a controller, wherein the controller is connected to a power supply; the power supply is connected to the first source and the thermal mechanism. The method further includes informationally connecting the controller to a control device connected to a detector, wherein the detector is connected to a second device. The actuator is utilized to articulate the arm and module to a calibration position wherein the source is in line with the detector. Electromagnetic radiation such as thermal radiation directed is from the source towards the detector.

BRIEF DESCRIPTION OF THE DRAWINGS

In what follows, preferred embodiments of the invention are explained in more detail with reference to the drawings, in which.

DETAILED DESCRIPTION

Overview

Figure 1A:
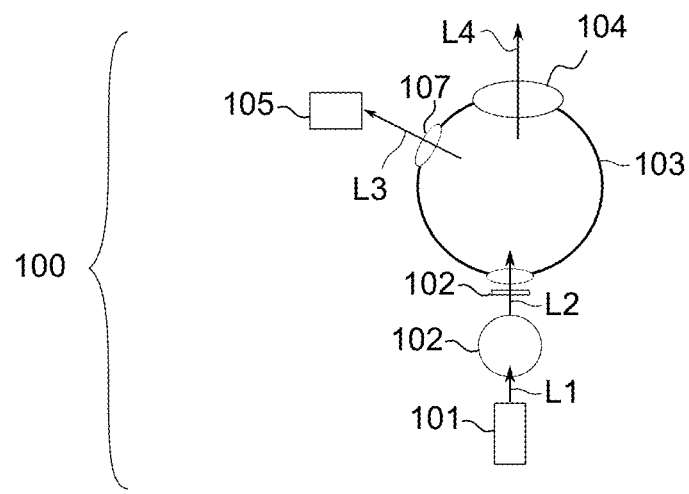
FIG. 1A is a schematic illustration of a calibration device 100 having a single source 101 and a single first diffuser 102, according to one embodiment of the present invention.
Figure 2A:
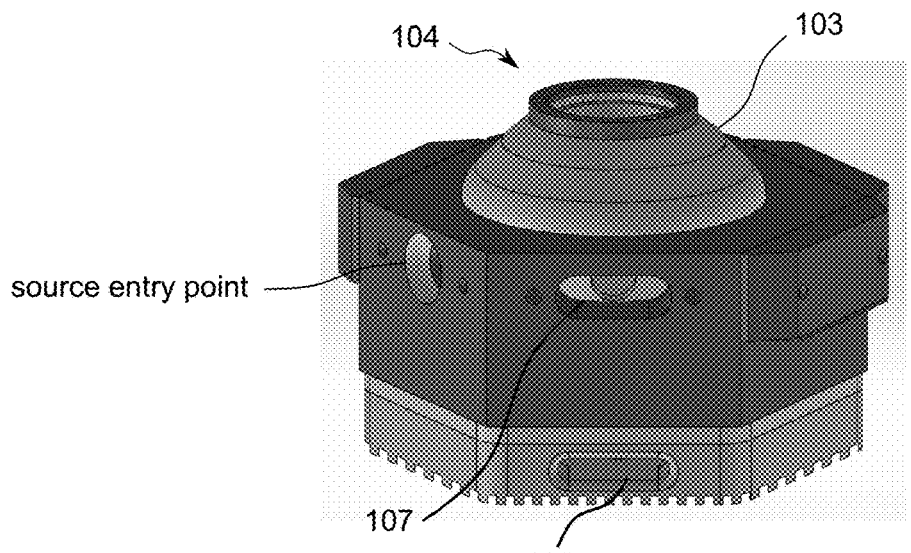
FIGS. 2A and 2B are schematic perspective and partial cutaway views, respectively, of a calibration device 100 showing thermal mechanism 106, and thermal mass 111 according to one embodiment; sources 101 and some of first diffusers 102 are removed for illustrative purposes.
Figure 2B:
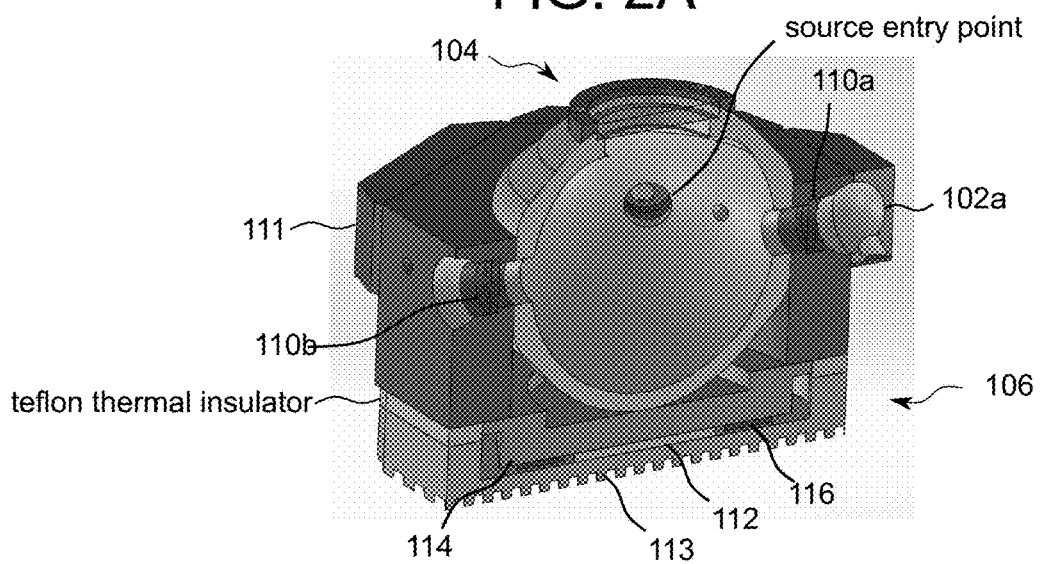
Figure 4:
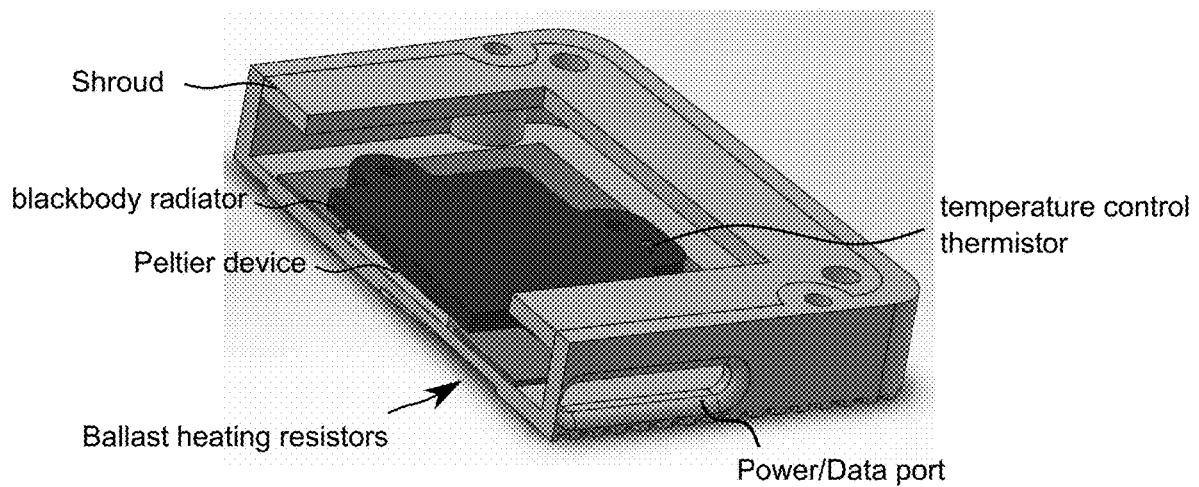
FIG. 4 is a partial cut-away view of the lower portion of the device of FIGS. 2A-2B.

One aspect of the invention may be accomplished by a calibration device 100, FIG. 1A, having at least one light source 101, at least one first diffuser 102, an integrating sphere 103 (also referred to herein as a first integrating sphere), an exit port 104, an optional radiometer 105, and a thermal mechanism 106 (such as illustrated in FIGS. 2B and 4). The source 101, as illustrated in FIG. 1A, emits electromagnetic radiation, abbreviated EMR, (represented by arrow L1) into the first diffuser 102, where the EMR is diffused and only a portion L2 of the emitted EMR passes from the first diffuser 102 through an optional bandpass filter 110 and into the integrating sphere 103 through a source entry port 120. The integrating sphere 103 further diffuses the passed L2 EMR, passing only a portion L3 of L2 EMR through radiometer port 107, as well as another portion L4, also referred to herein as a calibration portion of EMR, through exit port 104 and delivered optically to a separate detector to be calibrated. The radiometer 105 then detects the L3 EMR and converts it to machine readable information, referred herein as irradiance data 108. The detector to be calibrated detects L4 EMR and also produces machine readable information, referred herein as image data. One or both of the irradiance data 108 and the image data may then be used by a digital control solution as known in the art to calibrate the detector; typically, the detector is capable of detecting at least the wavelengths of EMR as emitted from the first light source 101. One known digital control solution is referred herein as the CubeSat controller.

Source 101

Figure 1B:
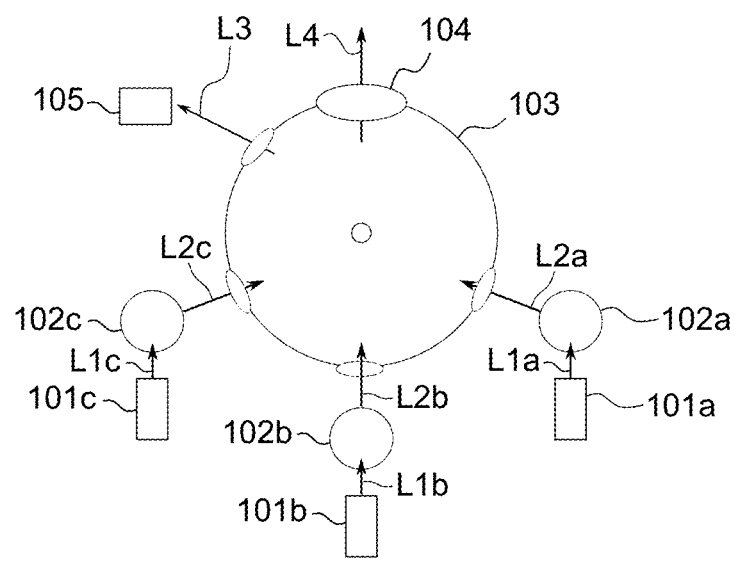
FIG. 1B is a schematic illustration of a calibration device 100a having a three sources 101a-c and three first diffusers 102a-c, according to another embodiment of the present invention.

Methods and apparatus according to the present invention, such as calibration device 100, FIG. 1A, provide one or more sources 101 that emit different wavelengths of EMR. Typically, embodiments with more than one source 101 will have the sources spaced around the integrating sphere 103. In most embodiments, the EMR sources will be evenly spaced around the integrating sphere 103. For example, as illustrated in FIG. 1B (which is not drawn to scale), calibration device 100a has a first source 101a, a second source 101b, and a third source 101c arrayed around integrating sphere 103. First source 101a produces EMR L1a delivered to first diffuser 102a, which in turn delivers EMR L2a to integrating sphere 103. Likewise for this embodiment 100a that has more than one source of EMR, a second source 101b produces EMR Lib and delivers it to first diffuser 102b, producing EMR L2b which is passed to integrating sphere 103. Additional sources, may be provided to do similar EMR production and delivery. Typically, only one source will be active at a time, enabling sequential calibration of multiple detectors.

Each source may be any suitable solution or solutions as known in the art. In some of the currently preferred embodiments, source 101 is an LED circuit as commonly known, designed to emit a narrow bandwidth of EMR. In some embodiments a source 101 also comprises a bandpass filter to further select the wavelengths of EMR passed into a first diffuser 102, as EMR L1, and ultimately into integrating sphere 103, as EMR L2. In one embodiment, as illustrated in FIG. 1B, a device 100a has three sources 101a-c; but a specific embodiment may have additional or fewer sources 101. If an imaging solution is provided with additional detectors (e.g., five detectors) only a single calibration device is required, if that device has multiple sources 101, each source (and filter is used) enables calibration at different wavelengths or wavelength groups for each detector to be calibrated.

First Diffuser 102

The present invention provides one or more first diffusers 102 that enable a compact calibration device 100 by diffusing a sources' EMR before delivery to the integrating sphere 103. In other words, a first diffuser 102 passes only a portion of EMR (arrow L1) from the source 101 to the connected integrating sphere 103, also referred to herein as a first integrating sphere. The first diffuser 102 is optically connected to a source 101 and the integrating sphere 103. In the majority of embodiments, each source 101 present will have a first diffuser 102. First diffuser 102 is typically a second integrating sphere 102, as known in the art, and discussed in the integrating sphere 103 section herein below. Preferably, a first diffuser integrating sphere 102 will be physically smaller than the integrating sphere 103.

In many embodiments the first diffuser 102 is housed within the thermal mass 111. In some embodiments, some of the first diffusers will further have a filter 110 between that first diffuser 102 and the integrating sphere 103 to select the wavelength or wavelengths of EMR passed into the integrating sphere 103 (as EMR L2). One example of such a filter 110, is illustrated in FIG. 2B, where first diffuser 102a has filter 110a between itself and integrating sphere 103. Filter 110 may be any suitable solution or solutions as known in the art. In some embodiments, one or more first diffusers 102 has a modified reflective coating, such as an absorptive coating, on its internal walls, such that this modified reflective coating tailors the diffused EMR, tailoring or otherwise selecting EMR wavelengths that are sent on as EMR L2 to the integrating sphere 103. Often, in these cases with first diffusers with modified reflective coatings do not need a filter 110 between it and the integrating sphere 103. In some less preferred embodiments, the filter 110 is a variable filter wheel. One exemplary source 101 may be one of the Spectra-FT fine tunable VIS-NIR (visible-near infrared) spectral calibration sources, commercially available from Labsphere, Inc. of North Sutton, N.H. ("Labsphere").

Integrating Sphere 103

The present invention provides for a first integrating sphere 103 that accepts EMR originating from each source 101 for calibration by the radiometer 105, for the purpose of calibrating one or more detectors. The first integrating sphere 103 may be any suitable solution or solutions as known in the art. Known integrating spheres 103 are spherical devices with diffuse reflective internal walls that collect and diffuse EMR from a source 101 completely external to the integrating sphere 103, often for flux measurement or optical attenuation. EMR introduced into an integrating sphere 103 strikes the reflective internal walls and undergoes multiple diffuse reflections. After numerous reflections, the EMR is dispersed highly uniformly at the sphere's internal walls. The resulting integrated radiation level is directly proportional to the initial radiation level and may be measured easily using a radiometer 105.

Typically, integrating sphere 103, sources 101 and radiometer 105 are configured to calibrate and detect visual and near infrared wavelengths. Additional details on integrating spheres are detailed in the "Integrating Sphere Theory and Applications" technical guide by Labsphere, PB-16011-000 Rev.00, 2017; incorporated by referenced in its entirety herein.

The internal radiometer serves two functions, first as an indicator that the calibrator is performing within nominal parameters, and second by providing a direct method for self-calibration by observing other objects. This can also be expressed as a method to perform an on-orbit vicarious calibration against "ground-truthed" (ground-verified) references. Typically in space borne imaging systems, celestial objects such as the Moon or bright stars are observed as a reference source. Conventional light source references do not provide a direct method to calibrate by observing other objects. Since the internal radiometer also experiences the same light being measured by the detectors, it can in turn utilize the internal radiometer to measure the bulk phase light and subsequently compare these values to ground or space borne references. This approach can also be applied to the thermal calibrator as the black body radiator coupled with the Peltier device can serve as a detector.

The integrating sphere 103 may be any suitable physical size; typically, smaller diameter spheres have smaller utility ports and very high throughput. The throughput may be so high, depending on the source 101, that filters or fiber optic cables are required to prevent detector saturation. The port fraction of the smaller spheres, however, is very high. Consequently, the measurement data generated from a small integrating sphere will be less spatially uniform than the same application using a large sphere. Larger integrating spheres exhibit less throughput than the smaller spheres and high optical attenuation, thereby introducing a higher signal-to-noise ratio. These spheres are more flexible but, at the, same time, are more expensive to manufacture, and present a physical limitation in some of the presently disclosed embodiments. In some of the smaller embodiments described herein, a small integrating sphere 102 physically smaller in size than integrating sphere 103 is provided to serve as first diffusers 102 integrating spheres between the integrating sphere 103 and source 101.

In some embodiments, the integrating sphere 103 is constructed from an aluminium alloy, or an aluminium metal. In some embodiments, a three-dimensional filament is used to construct the integrating sphere 103. In some preferred embodiments, the internal walls of the integrating sphere 103 are coated with Spectralon™ (some embodiments use space-rated Spectralon, other embodiments use non-space rated Spectralon). In some embodiments, vapor deposition of a white, neutral, non-absorptive diffuser material is used to coat the interior walls of the integrating sphere 103. Preferably, the coating on the internal walls are sufficiently coarse to provide the desired EMR diffusion such that radiometer 105 and detector receive 1% or less of source's original output EMR L1. Preferably the integrating spheres 103 used in the embodiments disclosed herein are small, typically less than 10 cm in diameter, preferably 7 cm or less, more preferably 5 cm or less. In one preferred embodiment, integrating sphere 103 is 4 cm in diameter. In some larger embodiments, the integrating sphere 103 is the LMS-025, a 25 cm diameter sphere commercially available from Labsphere with a Spectraflect internal coating.

Preferably, the integrating sphere 103 does not comprise an internal baffle, or other internal diffusing plate. Internal baffles, and their use with integrating spheres is well known in the art; and is describe in more detail in Snail and Hanssen 1989, Applied Optics, 28 (10), pp. 1793-1779, incorporated by referenced in its entirety herein. Many preferred embodiments herein are capable of surviving physically a rocket launch into space and insertion into orbit, commonly referred as the 'launch environment'. Typical stresses in the launch environment are vibration, Max Q (the point when an aerospace vehicle's atmospheric flight reaches maximum dynamic pressure), acceleration (i.e., G-forces), out-gassing, and deployment shock. These stresses are particularly impactful on any component that could shatter or be knocked free by those stresses. An illustrative launch environment stress is random vibrations experienced during launch; how random vibration levels interact with a satellite and a calibration device 100 depend on the dynamics and physical arrangement of the satellite and its associated supports in the launch vehicle. One common method of approximating a design load from the random vibration power spectral density profile is to take a three-sigma approximation and multiply the overall root mean square acceleration ($G_{rms}$) level by three, to account for 99.73% of all possible load cases; often a total of 30 g's in a typical CubSat launch. Additional vibration stresses are detailed in Pignateli et al. "Improving Launch Vibration Environments for CubeSats" 2017 31$^{st}$ Annual AIAA/USU Conference of Small Satellites, incorporated by referenced in its entirety herein; and additional launch environment stresses are detailed in the Goddard Technical Standard "General Environmental Verification Standard (GEVS) for GSFC Flight Programs and Projects" April 2013, NASA GSFC-STD-7000A, incorporated by referenced in its entirety herein. An internal baffle is one such component especially susceptible to these launch environment stresses.

Exit Port 104

The present invention provides for an exit port 104, enabling a detector to image the same EMR as the radiometer 105. Exit port 104 allows EMR L4 to impinge onto one or more detectors. To accommodate more than one detector optically downstream of the calibration device 100, beam splitters or another solution as known in the art may be employed. In some embodiments, the exit port 104 is translucent, in some embodiments the exit port 104 is transparent, and in some embodiments, the exit port 104 is opaque. In these different embodiments, different portions of EMR inside the integrating sphere 103 pass through exit port 104 as EMR L4. Often, the exit port 104 serves as the surface that the one or more detectors image or otherwise view. The size and physical characteristics (e.g., material or opaqueness) of exit port 104 may vary with the embodiment, and may be any suitable solution or solutions as known in the art.

The exit port 104, along with the integrating sphere 103 and each first diffuser 102, enables a spatially distributed uniform light field as viewed on or through exit port 104. Preferably, the irradiance of EMR L4 is less than 1% different across the exit port 104 surface area. For example, for an exit port 104 having a 2 cm diameter, the irradiance will be <1% less at the exit port 104 edges (at 1 cm distant from center) than at the exit port 104 center (at 0 cm distant from center). Additional information integrating spheres and exit port irradiance is detailed in Walker and Thompson "Spectral Radiance of a Large-Area Integrating Sphere Source", Journal of Research of the National Institute of Standards and Technology 100, 37, 1995, incorporated by referenced in its entirety herein.

Radiometer 105

The present invention provides for a sensing solution for calibrating one or more detectors, the sensing solution is referred herein as the radiometer 105. The radiometer 105 measures the irradiance flux internal to the integrating sphere 103. The radiometer 105 may be any suitable solution or solutions as known in the art and is most often connected to circuitry for producing and sending machine readable information, irradiance data 108, to additional components, especially the CubeSat controller. The radiometer 105 is optically connected to integrating sphere 103 by way of at least radiometer port 107. In some embodiments, radiometer 105 is further connected by fiber optic cables connecting port 107 to radiometer 105. In one embodiment port 107 is a 2 cm, optical disk. In one embodiment, the radiometer 105 is commercially available from AMS-AG of Austria, category number TCS3200, and delivers individual Red, Green, Blue values (e.g., a Bayer filter), and in addition, delivers values from an unfiltered photodiode. The photodiode preferably follows the typical Quantum Efficiency curve and is used to detect the NIR bands. In more simplistic words, the photodiode may be considered as equivalent to the color sensor in a camera plus a detector for all the other wavelength bands. Such radiometers are used in industry and science for color recognition instrumentation.

The radiometer 105 is connected to the CubeSat controller by a connection as known in the art. In one embodiment, this connection is a power-in, power-out, data-in, and data-out four-channel connection. Preferably, the data structure is same for the radiometer 105 as it is for the thermal mechanism 106, described elsewhere herein. The radiometer 105 produces machine readable information (the irradiance data 108) and this data comprises light values of EMR L3 as received from the integrating sphere 103. In addition, the irradiance data 108 also passes along diagnostic information for processes and states of the radiometer's circuity. In some embodiments, this information may be further telemetered from a satellite on orbit to earth.

Thermal Mechanism 106

The present invention also provides a thermal mechanism 106 to adjust or otherwise control the temperature of selected components in device 100. Preferably, the thermal mechanism 106 adjusts and maintains the temperature of the one or more source 101 to ensure consistent performance and emission of selected EMR wavelength bands. In many preferred embodiments, the thermal mechanism 106 adjusts and maintains temperature of the temperature one or more electronic reference components, typically the radiometer 105 and associated circuitry, such as amplifiers, passives (e.g., resistors), and analog-to-digital converters. In many embodiments, the integrating sphere 103 and first diffuser 102 are too small to exhibit measurable thermal drift and therefore do not require thermal adjustment or other temperature control.

The thermal mechanism 106 may be any suitable solution or solutions as known in the art. In some currently preferred embodiments, the thermal mechanism 106 is a Peltier device 112 with an integrated circuit board. Additionally, the thermal mechanism 106 may have a back heatsink and channelled radiators 113 for more efficient thermal management, and or in addition to, a thermal transfer plate 114 for efficient thermal transfer to the integrating sphere 103. Most often, the thermal mechanism 106 also comprises a port 115 and matching cable (for power and data), connecting the CubeSat controller to the circuit board 116 of the thermal mechanism 106. The power and data port 115 and cable may be any suitable solution or solutions as known in the art, preferably as four-pin connection of data in, data out, power in, and power out. Power provided by this cable supplies the electricity to run the thermal mechanism 106, specifically the Peltier device 112, and the power to run the circuitry 116. In some embodiments, command of the thermal mechanism 106 is provided by the data in connection in serial commands presenting power on and power off states.

In addition, embodiments may comprise a thermal mass 111 that accepts thermal energy (e.g., heat or the absence of heat) from the thermal mechanism 106. The thermal mass 111 may be any suitable solution or solutions as known in the art, and preferably also serves as a mounting solution for one or more of the following group; including source 101, first diffuser 102 (in embodiments and sources with first diffusers), and integrating sphere 103. In addition, the thermal mass 111 may cover and protect at least one of a source 101 and a first diffuser 102.

Calibration Device 100'

In other embodiments also provided by this disclosure, a calibration device 100', FIGS. 5-12, is provided having a module, an arm, and an actuator. The module contains a calibrating radiation source or sources, referred herein simply as sources, and a thermal mechanism. The sources emit electromagnetic energy, most often a narrow bandwidth of energy, for calibrating a sensor or detector separate from the present invention. The thermal mechanism 106 enables precise temperature control of the source, either by heating or cooling the source to a specific temperature. The thermal mechanism 106 may also act as a source of thermal energy for calibration.

In these other embodiments, the arm is connected to the module, and the arm and actuator together enables the module to be moved from a stowed position into one of several calibration positions, typically within direct line of sight of the separate detector. Often, the arm may be actuated into other positions in addition to the calibration positions. One such position that may be useful depending on the embodiment, is a calibrate-the-calibrator position, where the source internal sensing monitors themselves be calibrated by observing a separate source or emissive body (e.g. the Earth, deep space, or other celestial bodies). The, arm further has an attachment and a pivot point. The pivot point is the point at which the arm may be actuated away from the body of the attached object (e.g. a cube satellite, or CubeSat). The attachment points are the point or points that the arm is attached to the attached object and additional attachment points are provided on the arm for connecting the arm to the module.

In most of these other embodiments, the arm further encloses connection wires for the controller in the module. These connection wires enable informational connectivity and power to the controller from a separate control device, i.e. a CubeSat controller. Most often, connection wires comprise connections for power in, data in, data out, and ground. A simplified connection wire arrangement reduces mass, overall system volume, interfacing complexity, and with a thermal source (thermal mechanism) control coordination and increase power efficiency. More connections may be present, but one useful aspect of this invention is the simplicity of the design and there is no need for additional wires in most embodiments.

Figure 5:
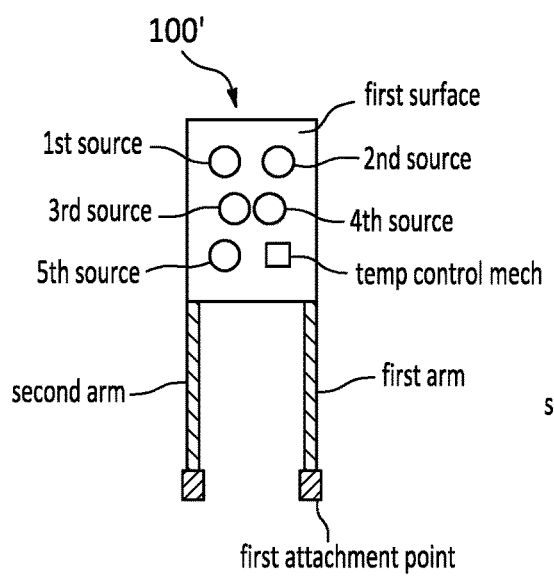
FIG. 5 is a schematic illustration of the first surface of a calibration module, according to one embodiment.
Figure 6A:
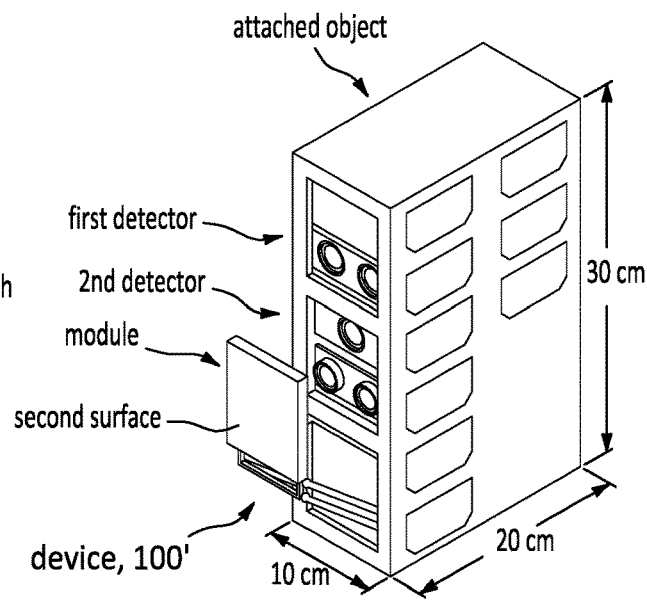
FIGS. 6A and 6B are schematic representations of a device connected to an attached object, in these cases, a 6 U CubeSat.
Figure 6B:
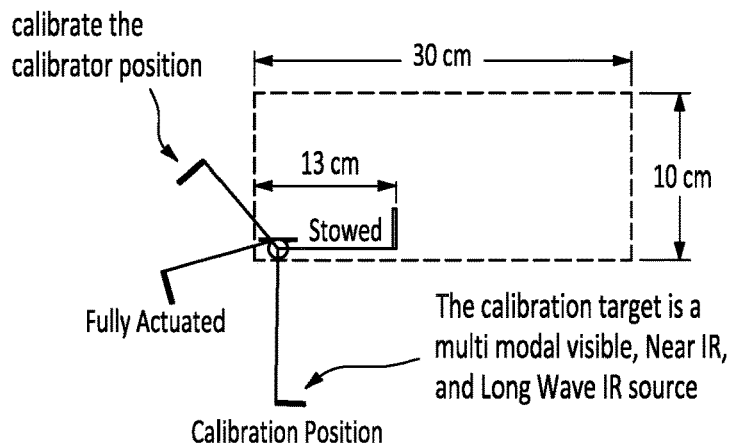

Device 100', as illustrated in FIG. 5, has two arms, an actuator, and a module or calibration target. The module further has at least a first source, and the illustrated embodiment, further includes a second, a third, a fourth, and a fifth source. Each source has a specific emission pattern and typically calibrates a different detector, or one of several wavelength range for a detector. Device 100 enables contactless closed loop feedback calibration control.

Module

A module or calibration target enables the present invention to provide sources of electromagnetic energy for calibrating a detector. The module physically contains the sources, a controller, and at least one thermal mechanism 106 (also a calibration source in some embodiments, for example when calibrating a LWIR detector). The module is movable by an actuator and is capable of attaining different positions, each position having useful purposes of the device.

The module has two main surfaces, a first surface facing the attached object where the sources and temp control mechanism protrude or are otherwise exposed to the detector. And a second surface opposite the first surface that points away from the attached object. The second surface may be configured to reflect ambient electromagnetic energy away from module, radiate away heat from within the module, or a combination thereof In one embodiment, this includes a wavey surface that increases the surface area of the second surface such that more heat may radiate from the module. In another case, the second surface is coated in a reflective substance (e.g. paint) such that ambient electromagnetic radiation (i.e. direct sunlight) is reflected and not absorbed by the module.

Sources

The present invention provides for at least one radiation source for calibrating a detector.

In the currently preferred embodiment, the source is configured to be aligned directly with the detector such that electromagnetic energy emitted by the source is received by the detector. In some embodiments, a source will emit a defined band of electromagnetic energy. In some embodiments, a source has a fixed frequency band of emission, e.g. 412 nm. In some embodiments, a source may provide many points over a range of illumination levels.

The source or sources may be any device as known in the art. In the currently preferred embodiment, the sources are light emitting diodes (LED) that emit specific wavelengths of electromagnetic radiation. Each source is connected to a power supply, and is controlled by the controller, often indirectly via the source's power supply.

The sources, as provided herein, can be considered electrically as a single integrated source. The sources only require power in and ground. The controller controls the current supplied to each source, thus controlling their state and power levels. This enables a single power in and a single ground connection wire suppling device 100, and most typically to the controller.

In some embodiments, a source may further include a spacer to form an optical filter, a diffusor, or other type of bandpass filter, depending on the target detector. In the currently preferred embodiment, three sources are provided to calibrate a visual RBG camera (one source for each red, blue, and green wavelength), one source for near infrared (IR), one source for deep blue and one source for long wave IR (LWIR). In the currently preferred embodiment, the LWIR source comprises a thermal black body radiator.

In some embodiments, the sources and circuit may act as calibrators themselves, along with a filter, the device 100 is essentially a detector. Facing a source of electromagnetic energy (i.e. pointed towards Earth), the source may itself be calibrated or validated.

Thermal Mechanism

A thermal mechanism 106 enables the present invention to control the specific temperature of each source. Ideally, detector calibration is performed with a source that is the same temperature as the scene of interest that the detector will be imaging. Therefore, precise temperature control is important when calibrating a detector. The thermal mechanism 106 enables heating and cooling of the sources in the module, enabling a wider dynamic range for calibration. Depending on the embodiment, the device 100 may have a single thermal mechanism, or multiple thermal mechanisms, depending on the source number, type, and arrangement. In the currently preferred embodiment, the thermal mechanism 106 comprises a Peltier device 112, enabling thermoelectric cooling of sources by supplying a current to the Peltier device 112. In one direction, current enables heating the mechanism, and by revering current direction, the Peltier device 112 enables the cooling of surrounding sources. The thermal mechanism 106 is connected to and controlled through a power-in (i.e., a power supply) connection. Operation of the thermal mechanism 106 is enabled by the controller. In this construction, thermal insulator 130, made of a material such as PTFE (polytetrafluoroethylene), provides thermal separation between at least a portion of thermal mechanism 106 and thermal mass 111.

In one embodiment, the thermal mechanism 106 is a Peltier device 112 driven by a high current H bridge to force heat transfer in either direction, initially cooling and then heating. A cylinder with a black interior and white exterior may extend up around the entire optical assembly to draw or add heat to the filter. With 2.1 amps of drive current, the well can be driven from −15 degrees Celsius to 80 degrees Celsius in 22 minutes. The blue line is detector temperature, red is the heat sink temperature, green is the differential between detector and heat sink temperature. The units for the command are scaled for corresponding thermistor values and are not in degrees. This is the cool down only mode. Heat absorbed in the sink is later used to drive the source to higher temperature without requiring a polarity change.

Controller

A digital control device, referred herein as a controller, is most often provided in the module to enable control of device 100. It is within the scope of the present invention for the controller to be located within the attached object, however such an arrangement increases the connectivity complexity. Therefore, the currently preferred embodiment comprises a controller, often a digital single board computer, within the module. The controller may be any control device as known in the art. Often the controller is a single board computer.

Typically, the controller handles all aspects of device 100, including activation, power levels and duration of sources, thermal mechanism, and actuator. In some embodiments the controller has information and programming stored on computer readable medium (abbreviated CRM). The CRM is most often non-transitory, that is the information is not encoded on transitory signals. The CRM may be encoded onto a physical piece of memory, for example a CD-rom, a flash drive, a single board computer, and the like, as long as it is substantially permanent that the information encoded therein (i.e. programmed steps or firmware) may be carried out on an applicable controller and the connected components.

In most embodiments, the controller is on a single board and acts as a central point for all connections. In the currently preferred embodiment, four connection wires enter device 100 through the arm and connect directly to the controller. Each interconnected component then has a connection through the controller. In other, less preferred embodiments, some connections bypass the controller, or a dedicated power supply is located within the module and no power in connection wire exists, for example.

Arm

The present invention provides a means for moving and separating the sources from the attached object and its detector(s). In the currently preferred embodiment, at least one arm provides this ability. As illustrated in FIG. 5, a calibration device 100' comprises two arms attached to the module and the attached object. The actuator provides the motive force to move first and second arms from one position to another (e.g. stowed position to calibrate position). Most often an embodiment comprises connection wires, which travel to the attached object through at least one arm.

The arm comprises a pivot point that enables movement of the arm from one position to another. It is to be understood that the illustrations provided herein are only one possible solution for arm physical appearance and movement, that other arrangements would be within the scope of the invention, and would be apparent to a person having ordinary skill in the art. Likewise, the attachment point may be arranged differently than illustrated. Preferably, device 100' represents a separate device that may be attached to a range of objects (e.g. many different sizes and types of micro satellites, or other observing sensors) and any attachment arrangement would be within the scope of the present invention. The locations on the arm where the arm attaches to the module and the attached object are referred herein as the first and second attachment points. There may be more than one first attachment point or more than one second attachment point, depending on the embodiment.

Actuator

Figure 8:
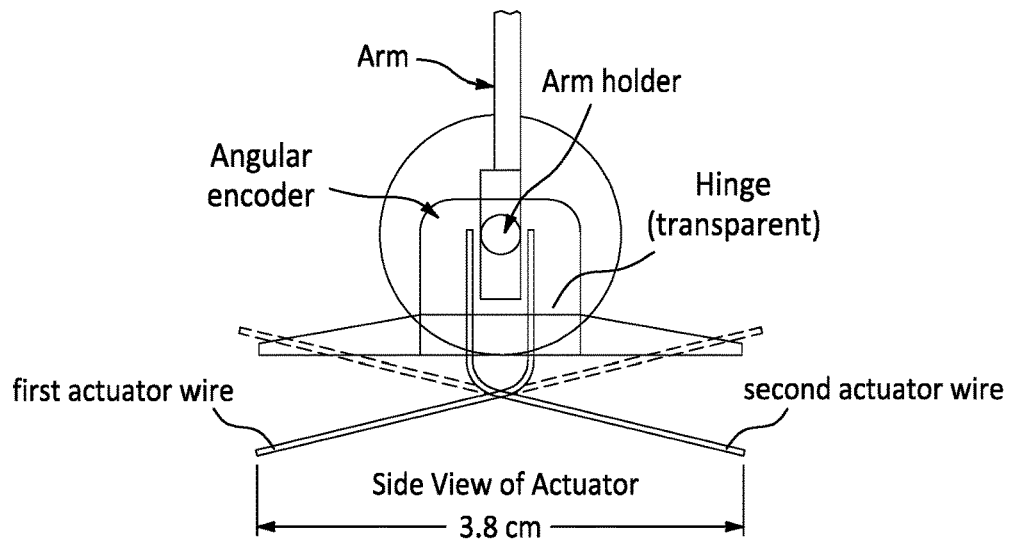
FIG. 8 illustrates the pivot point of the arm according to one embodiment.
Figure 9:
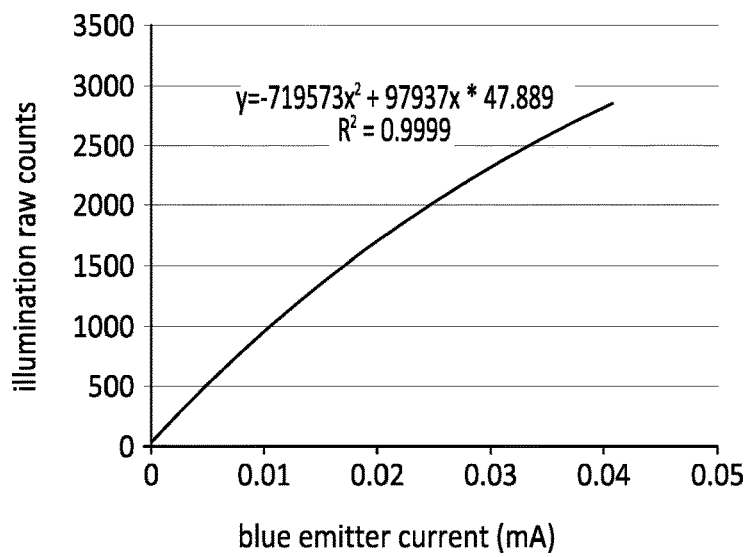
FIG. 9 shows the relationship between the current, in milliamps, from a source emitting blue light wavelengths and raw counts of illumination of a detector.
Figure 10A:
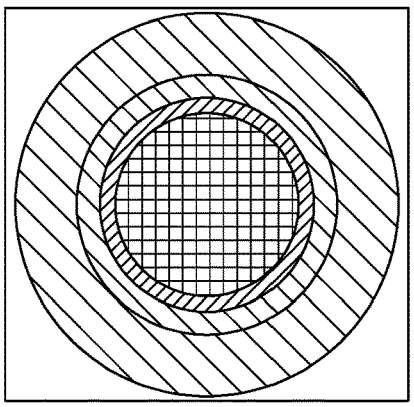
FIGS. 10A-10F, also referred to as Images 10A-10F, are images of a LWIR thermal imaging source at different calibration temperatures.
Figure 10B:
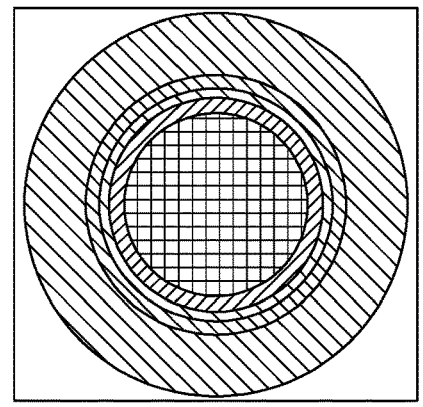
Figure 10C:
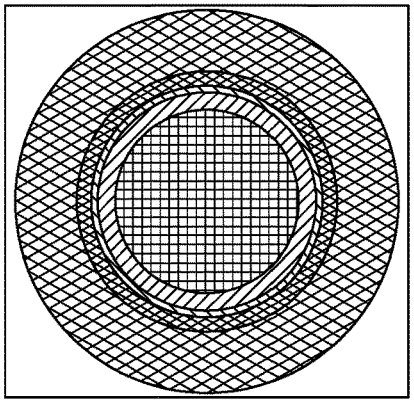
Figure 10D:
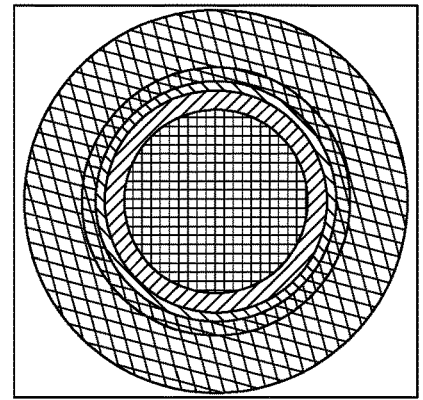
Figure 10E:
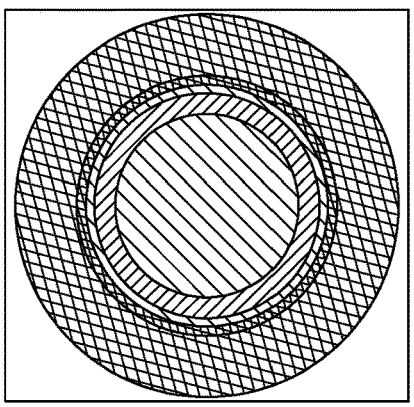
Figure 10F:
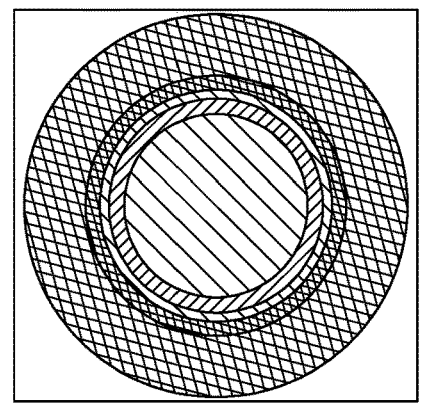

The present invention provides for a means of actuating the module in relation to the attached object, referred generically herein as the actuator. The actuator may be any means as commonly known in the art. In one embodiment, the actuator is a brushless motor; in another embodiment, the actuator is one or more solenoids, or another linear or rotary actuator. In one embodiment, the actuator is a Shape Memory Alloy (SMA) rotary actuator. An actuator within the scope of the present invention is illustrated in FIG. 8, the actuator comprises two wires within the pivot point. An arm holder connects an arm to a hinge at the pivot point. An angular encoder encompasses these components. The first and second actuator wires extend into the angular encoder, and alternating heating of the first and second actuator wires allows actuation of the attached arm to different positions as shown by dashed lines.

Figures 3A, 3B:
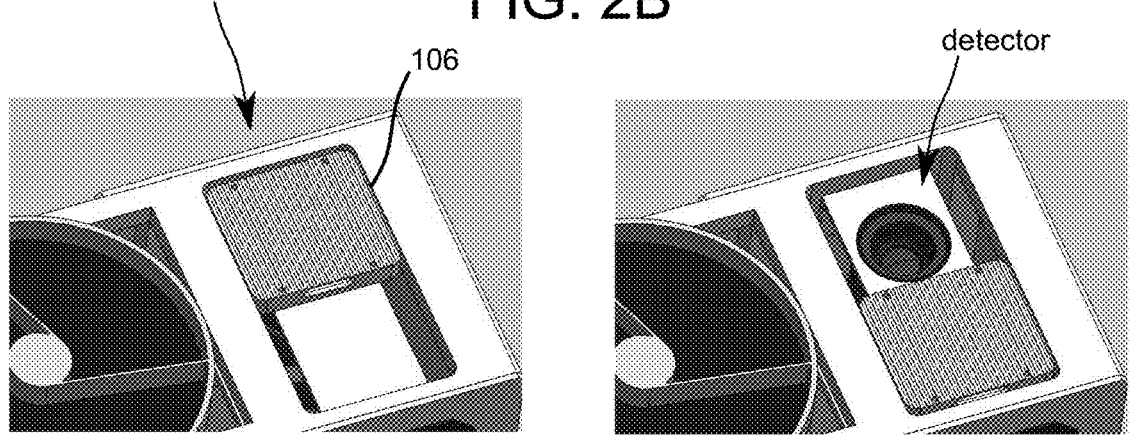
FIGS. 3A and 3B are schematic views of a calibration shutter-type device having a LWIR thermal calibrator according to the present invention in a calibrate position, FIG. 3A, and a stowed position in FIG. 3B on a CubeSat CS.

Another embodiment with an actuator that is within the scope of the present invention is illustrated in FIGS. 3A and 3B for a CubeSat CS. In this embodiment, an adjustable module 100' has a source for calibrating a detector DT. Actuator moves modules in front of detector DT, illustrated in FIG. 3A and enabling calibration, and away from detector DT, illustrated in FIG. 3B and enabling detector imaging. Here, detector DT is a thermal detector and the source 101 emits precise thermal energy (e.g., is heated or cooled to a specific temperature or temperate range). A side cut view of this module is shown in FIG. 4, where module 100' has a protective shroud 132, a black body radiator 114, a temperature control thermistor 134, a Peltier device 112, ballast heating resistors 116, and a circuit board (not visible). The module also has a power and data port 115, similar to device 100 thermal mechanism 106 data and power connection that connects to the circuit board. In most embodiments, this circuit board is similar to or exactly the same as the board in thermal mechanism 106, FIG. 2B.

In some embodiments, the device 100' further includes a spring loaded one-time fusable link incorporated into the pivot point providing a safety mechanism in the event of actuator failure while device 100 is positioned in line with a detector (e.g., calibrate position), or stuck in another position deemed detrimental.

Positions

Figures 7A, 7B:
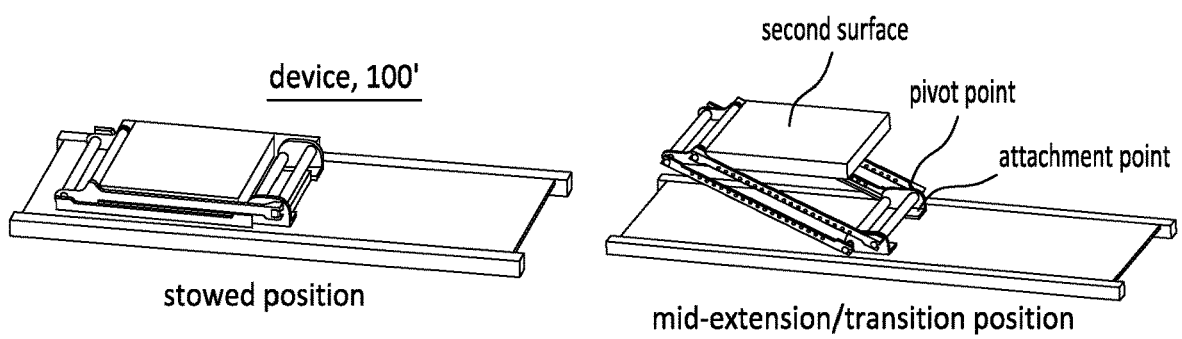
FIGS. 7A-7D illustrate three possible positions from two views of the device and a section of the attached object.
Figure 7C:
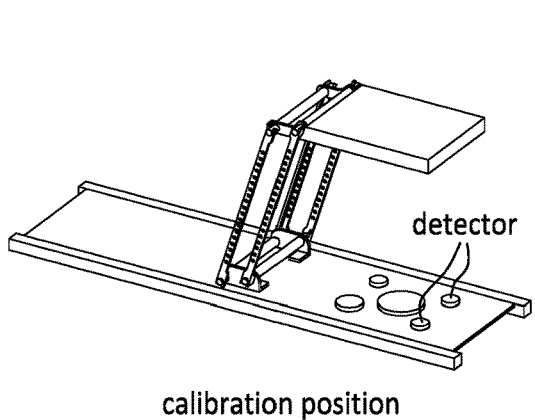
Figure 7D:
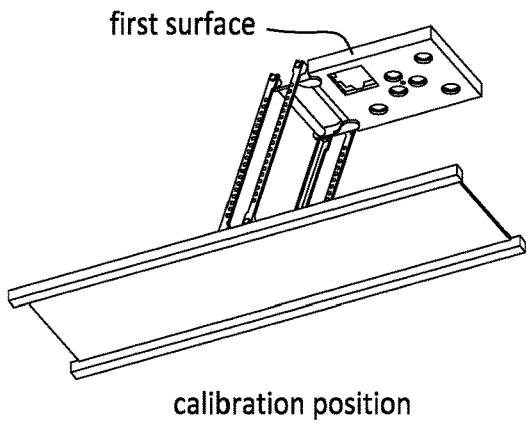

As discussed herein, device 100' is moveable to one of several positions. A stowed position is illustrated in FIG. 7A and enables the module and associated sources to be protected from ambient electromagnetic radiation or energy in the environment. The stowed position also facilitates any movement or other operations of the attached object (e.g. during satellite launch). Depending on the embodiment, the stowed position may be well suited for normal detector operation (i.e. operation not including calibration). Another position provided by the present invention is the calibration position shown in FIGS. 7C-7D. This position typically brings a source into the line of sight of a detector for the calibration process. The calibration position may comprise several positions, each representing the alignment of a source with its appropriate detector, if more than one source-detector pair exists in a given embodiment. An additional position is the calibrate-the-calibrator position, where the sources are pointed away from the detectors and point instead at another electromagnetic energy source. This position is useful for calibrating sources and controller in device 100, as well as providing a possible backup detection means if the attached object's main detector were to fail, fault, or otherwise not function. Additional positions between the above positions are possible and within the scope of the arm as moved by the actuator such as the "mid-extension/transition position" shown in FIG. 7B. These transitions positions may be further used to change the speed of articulation between starting position and final position.

Detectors

Figure 11:
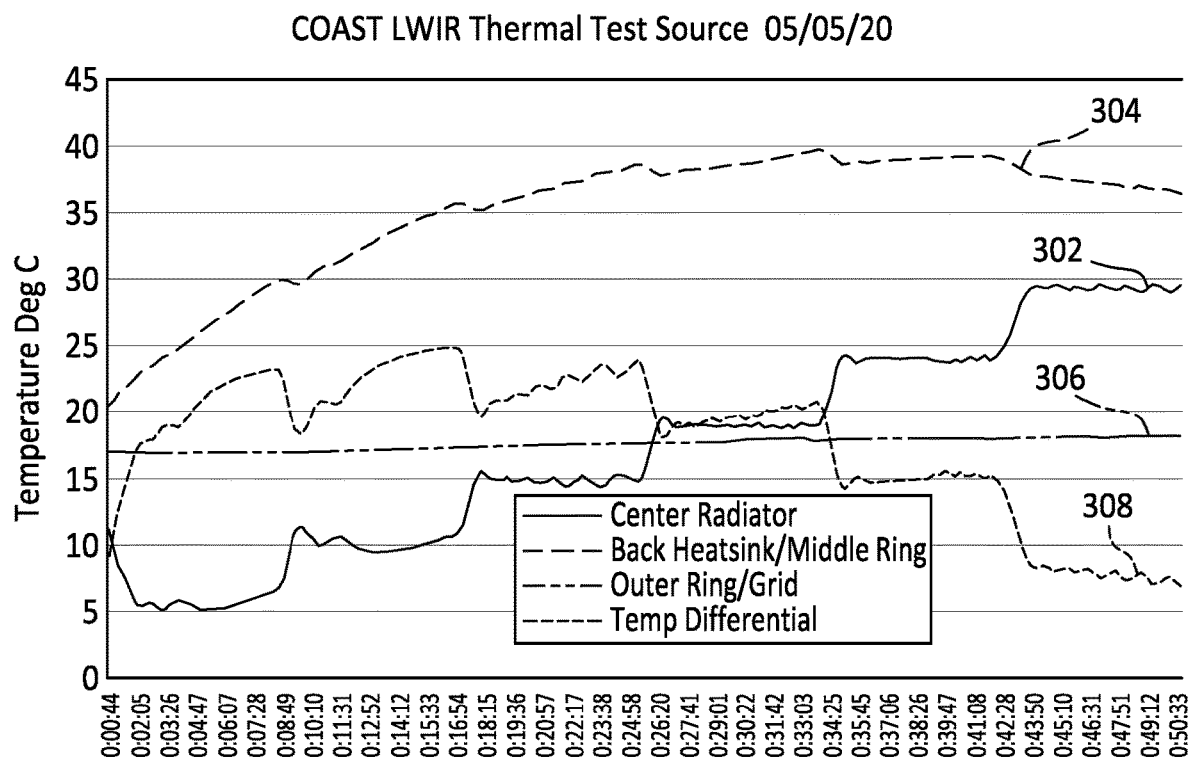
FIG. 11 is a graphical representation of the LWIR thermal source in FIGS. 10A-10F with curves 302, 304, 306 and 308 for center radiator, back heatsink/middle ring, outer ring/grid and temperature differential, respectively.
Figure 12:
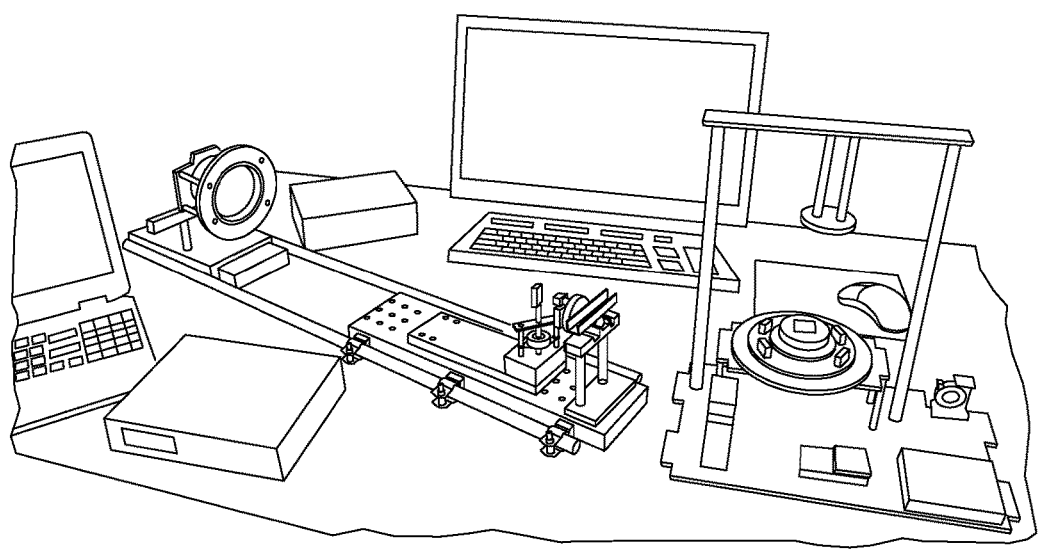
FIG. 12 shows the SEASALT optical and thermal calibration and development fixtures (L to R): three zone thermal calibration source, IR filter angle stepper, camera pedestal, optical (visible and near infrared) precision LED drive electrical current and thermal control stage with spectrometer for characterizing device performance. Also shown mounted to the optical bench are a black diffuse backstop and, in the rear, the visible white reflective target for visible camera tests.

The present invention is capable of working with almost any detector commonly known. However, for the purpose of this disclosure several detectors will be discussed that the currently preferred embodiment is adapted to calibrate. In one aspect of the currently preferred embodiment, the attached object has a single detector for imaging visible and near infrared (NIR) images, such as a mvBlueFOX-IGC single board camera, and a detector for imaging LWIR, such as a FLIR BOSON 320 thermal imaging camera. FIGS. 10A-10F, also referred to as Images 10A-10F, are images of a LWIR thermal imaging source at different calibration temperatures. FIG. 11 is a graphical representation of the LWIR thermal source in FIGS. 10A-10F with curves 302, 304, 306 and 308 for center radiator, back heatsink/middle ring, outer ring/grid and temperature differential, respectively. FIG. 12 shows the SEASALT optical and thermal calibration and development fixtures (L to R): three zone thermal calibration source, IR filter angle stepper, camera pedestal, optical (visible and near infrared) precision LED drive electrical current and thermal control stage with spectrometer for characterizing device performance. Also shown mounted to the optical bench are a black diffuse backstop and, in the rear, the visible white reflective target for visible camera tests.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A calibration device for calibration of a detector, comprising:
   a first source having a first source temperature and configured to produce first electromagnetic energy EMR;
   a first diffuser connected to the first source, including a second integrating sphere having a second interior surface, and configured to accept the first EMR and provide a first diffused portion of the first EMR;
   at least a second source having a second source temperature and configured to produce second electromagnetic energy EMR having a different frequency than the first EMR;
   a second diffuser connected to the second source and configured to accept the second EMR and provide a first diffused portion of the second EMR;
   a first integrating sphere defining an interior and optically connected to the first diffuser and the second diffuser, and configured to accept the first diffused portion from the first diffuser into the interior and to accept the first diffused portion from the second diffuser into the interior;
   at least one exit port connected to the first integrating sphere configured to pass at least a portion of electromagnetic energy; and
   a thermal mechanism configured to adjust and maintain at least the first source temperature and the second source temperature;
   wherein the second diffuser includes a third integrating sphere having a third interior surface;
   wherein the second integrating sphere is physically smaller than the first integrating sphere; and
   wherein the first integrating sphere is configured to pass only a second portion of the first diffused portion of the first EMR from the first diffuser to the exit port for use by the detector for calibration and is configured to pass only a second portion of the second diffused portion of the second EMR from the second diffuser to the exit port for use by the detector for calibration.

2. The calibration device of claim 1 wherein the third integrating sphere is physically smaller than the first integrating sphere.

3. The calibration device of claim 1 wherein the second integrating sphere includes a modified reflective coating disposed on the second interior surface.

4. The calibration device of claim 1 wherein the calibration device is configured to survive physically a rocket launch into space.

5. The calibration device of claim 4 wherein the calibration device is configured to operate in a satellite after insertion into orbit.

* * * * *